United States Patent
Chan et al.

(10) Patent No.: US 11,147,011 B2
(45) Date of Patent: Oct. 12, 2021

(54) MOBILE COMMUNICATION DEVICES AND METHODS FOR MANAGING NETWORK SLICING CONFIGURATION

(71) Applicant: Wistron Corp., New Taipei (TW)

(72) Inventors: Yu Chun Chan, New Taipei (TW); Shih Jui Liu, New Taipei (TW)

(73) Assignee: WISTRON CORP., New Taipei (TW)

( * ) Notice: Subject to any disclaimer, the term of this patent is extended or adjusted under 35 U.S.C. 154(b) by 15 days.

(21) Appl. No.: 16/703,048

(22) Filed: Dec. 4, 2019

(65) Prior Publication Data

US 2021/0068044 A1 Mar. 4, 2021

(30) Foreign Application Priority Data

Aug. 30, 2019 (TW) ................. 108131154

(51) Int. Cl.
*H04W 48/18* (2009.01)
*H04W 76/12* (2018.01)
(Continued)

(52) U.S. Cl.
CPC ....... *H04W 48/18* (2013.01); *H04W 28/0268* (2013.01); *H04W 28/18* (2013.01);
(Continued)

(58) Field of Classification Search
None
See application file for complete search history.

(56) References Cited

U.S. PATENT DOCUMENTS

| 2017/0086118 A1 | 3/2017 | Vrzic |
| 2017/0245316 A1 | 8/2017 | Salkintzis |

(Continued)

FOREIGN PATENT DOCUMENTS

| CN | 108632058 A | 10/2018 |
| WO | 2018/059494 A1 | 4/2018 |

OTHER PUBLICATIONS

Chinese language office action dated Apr. 30, 2020, issued in application No. TW 108131154.
(Continued)

*Primary Examiner* — Hong Shao
(74) *Attorney, Agent, or Firm* — McClure, Qualey & Rodack, LLP

(57) ABSTRACT

A mobile communication device including a wireless transceiver, a storage device, and a controller is provided. The wireless transceiver performs wireless transmission and reception using a Radio Access Technology (RAT). The storage device stores program code of a management program. The controller loads and executes the management program in an application framework layer to perform management of network slicing configuration, including: inquiring of the wireless transceiver about first network slicing configuration that is currently applied in the wireless transceiver; in response to an application being activated, determining whether the first network slicing configuration meets one or more requirement parameters of the application; and in response to the first network slicing configuration meeting the requirement parameters of the application, sending a first configuration success message to the application without requesting the wireless transceiver to reconfigure the first network slicing configuration.

10 Claims, 13 Drawing Sheets

(51) Int. Cl.
*H04W 76/11* (2018.01)
*H04W 28/02* (2009.01)
*H04W 28/18* (2009.01)
*H04W 48/16* (2009.01)
*H04W 72/04* (2009.01)
*H04W 72/12* (2009.01)

(52) U.S. Cl.
CPC ......... *H04W 48/16* (2013.01); *H04W 72/048* (2013.01); *H04W 72/1242* (2013.01); *H04W 76/11* (2018.02); *H04W 76/12* (2018.02)

(56) References Cited

U.S. PATENT DOCUMENTS

| | | | |
|---|---|---|---|
| 2018/0310238 A1* | 10/2018 | Opsenica | H04W 12/06 |
| 2019/0075467 A1 | 3/2019 | Mouquet et al. | |
| 2019/0174498 A1* | 6/2019 | Samdanis | H04W 16/10 |
| 2019/0182752 A1* | 6/2019 | Lou | H04W 48/08 |
| 2019/0230584 A1 | 7/2019 | Lou et al. | |
| 2020/0374792 A1* | 11/2020 | Liu | H04W 48/16 |

OTHER PUBLICATIONS

European Search Report dated May 28, 2020, issued in application No. EP 19216369.9.

Motorola Mobility; "Solution: PDU Sessions served by different Network Slices;" SA WG2 Meeting #114; Apr. 2016; pp. 1-4.

ITU-T Y.3112; "Series Y: Global Information Infrastructure, Internet Protocal Aspects, Next-Generation Networks, Internet of Things and Smart Cities;" Dec. 2018; pp. 1-20.

\* cited by examiner

US 11,147,011 B2

MOBILE COMMUNICATION DEVICES AND METHODS FOR MANAGING NETWORK SLICING CONFIGURATION

CROSS REFERENCE TO RELATED APPLICATIONS

This application claims priority of Taiwan Patent Application No. 108131154, filed on Aug. 30, 2019, the entirety of which is incorporated by reference herein.

BACKGROUND OF THE APPLICATION

Field of the Application

The application generally relates to the network slicing technology, and more particularly, to mobile communication devices and methods for managing network slicing configuration.

Description of the Related Art

With rapid development in cellular technology, more and more network services are being provided through mobile communication systems. However, the current fourth generation (4G) cellular technology (e.g., the Long Term Evolution (LTE) technology) may not satisfy the diverse requirements on bandwidth, throughput, and reliability for various application scenarios in the future. If future application scenarios are going to be realized under the 4G system architecture, operators will have to set up separate system networks for different application scenarios, which will inevitably result in significant cost hikes and will impact the operators' businesses.

Therefore, the International Telecommunication Union (ITU) proposes the network slicing technology for the next generation of mobile communication systems. The network slicing technology enables multiplexing of virtualized and independent logical networks on the same physical network infrastructure. Each network slice is an isolated end-to-end network tailored to meet the diverse requirements on bandwidth, throughput, and reliability for different application scenarios.

According to the standards specified by the ITU, there are three application scenarios in the fifth generation (5G) mobile communication systems. These include enhanced Mobile Broadband (eMBB), ultra-Reliable Low-Latency Communication (uRLLC), and massive Machine Type Communications (mMTC). Each application scenario may have different network characteristics, and radio resources may be effectively allocated by configuring the respective network slice for each application scenario.

FIG. 1 is a schematic diagram illustrating the allocation of separate network slices for different application scenarios. As shown in FIG. 1, applications such as video streaming, and Virtual Reality (VR) on smartphones generally require high bandwidth and correspondingly, an eMBB network slice may be configured for such applications. Applications such as temperature sensing, often used in the agriculture and logistics industries, generally involve a large number of sensors, and correspondingly, an mMTC network slice may be configured for such applications. Applications such as autopilot generally require high reliability and low latency, and correspondingly, a URLLC network slice may be configured for such applications.

Due to smartphones nowadays being capable of running all sorts of applications, mobile users are likely to develop the demands for applications of the eMBB, mMTC, and URLLC scenarios all running on smartphones. In such cases, a smartphone may have to request an eMBB network slice, an mMTC network slice, and a URLLC network slice when registering with a 5G network. As a result, the efficiency of radio resource utilization of the 5G network may be impacted, and power consumption of the smartphone may increase.

Therefore, it is desirable to have a robust way for smartphones to manage network slicing configuration.

BRIEF SUMMARY OF THE APPLICATION

In one aspect of the application, a mobile communication device comprising a wireless transceiver, a storage device, and a controller is provided. The wireless transceiver is configured to perform wireless transmission and reception using a Radio Access Technology (RAT). The storage device is configured to store program code of a management program. The controller is configured to load and execute the management program in an application framework layer to perform management of network slicing configuration. The management of network slicing configuration comprises: inquiring of the wireless transceiver about first network slicing configuration that is currently applied in the wireless transceiver; in response to an application being activated, determining whether the first network slicing configuration meets one or more requirement parameters of the application; and in response to the first network slicing configuration meeting the requirement parameters of the application, sending a first configuration success message to the application without requesting the wireless transceiver to reconfigure the first network slicing configuration.

In another aspect of the application, a method for managing network slicing configuration in a mobile communication device comprising a wireless transceiver and a controller is provided, wherein the controller executes a management program in an application framework layer to perform the method for managing network slicing configuration. The method comprises the steps of: inquiring of the wireless transceiver about first network slicing configuration that is currently applied in the wireless transceiver; in response to an application being activated, determining whether the first network slicing configuration meets one or more requirement parameters of the application; and in response to the first network slicing configuration meeting the requirement parameters of the application, sending a first configuration success message to the application without requesting the wireless transceiver to reconfigure the first network slicing configuration.

Other aspects and features of the present application will become apparent to those with ordinarily skill in the art upon review of the following descriptions of specific embodiments of the mobile communication devices and the methods for managing network slicing configuration.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
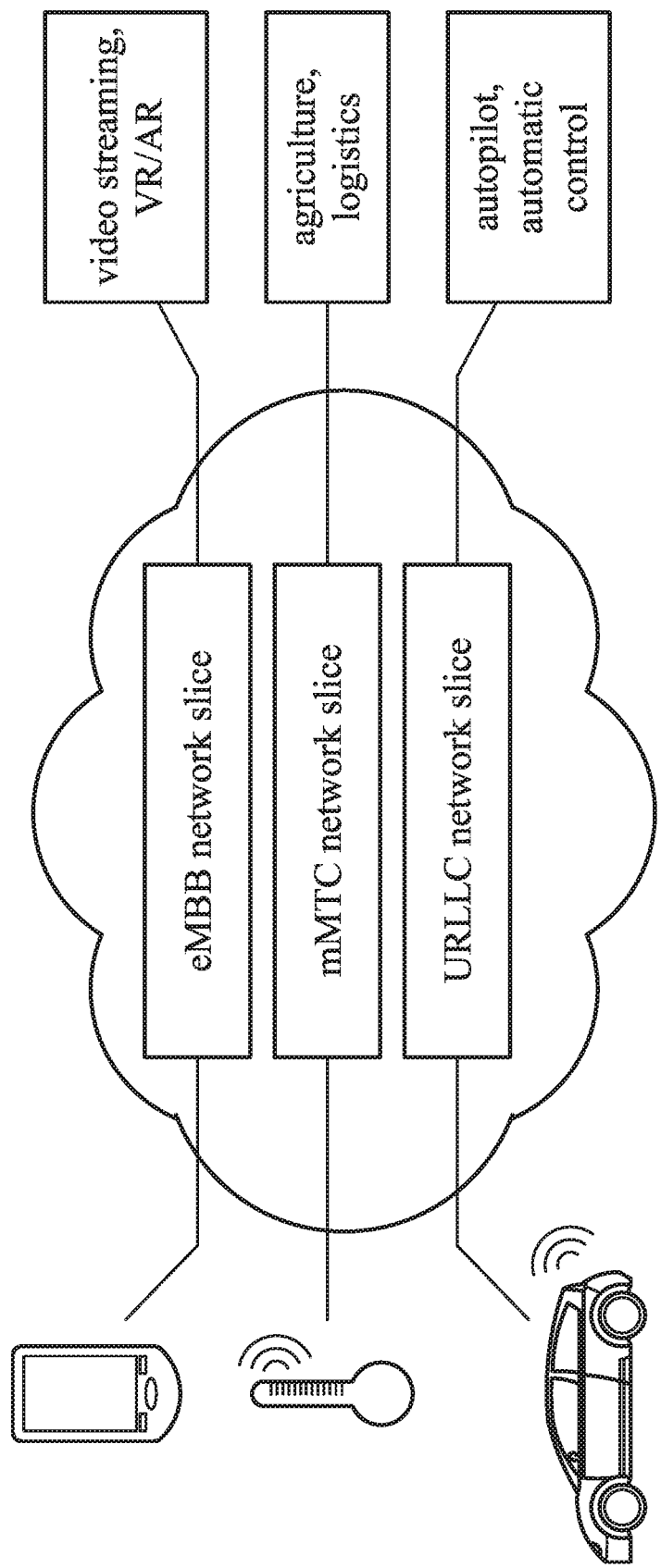
FIG. 1 is a schematic diagram illustrating the allocation of separate network slices for different application scenarios.
Figure 2:
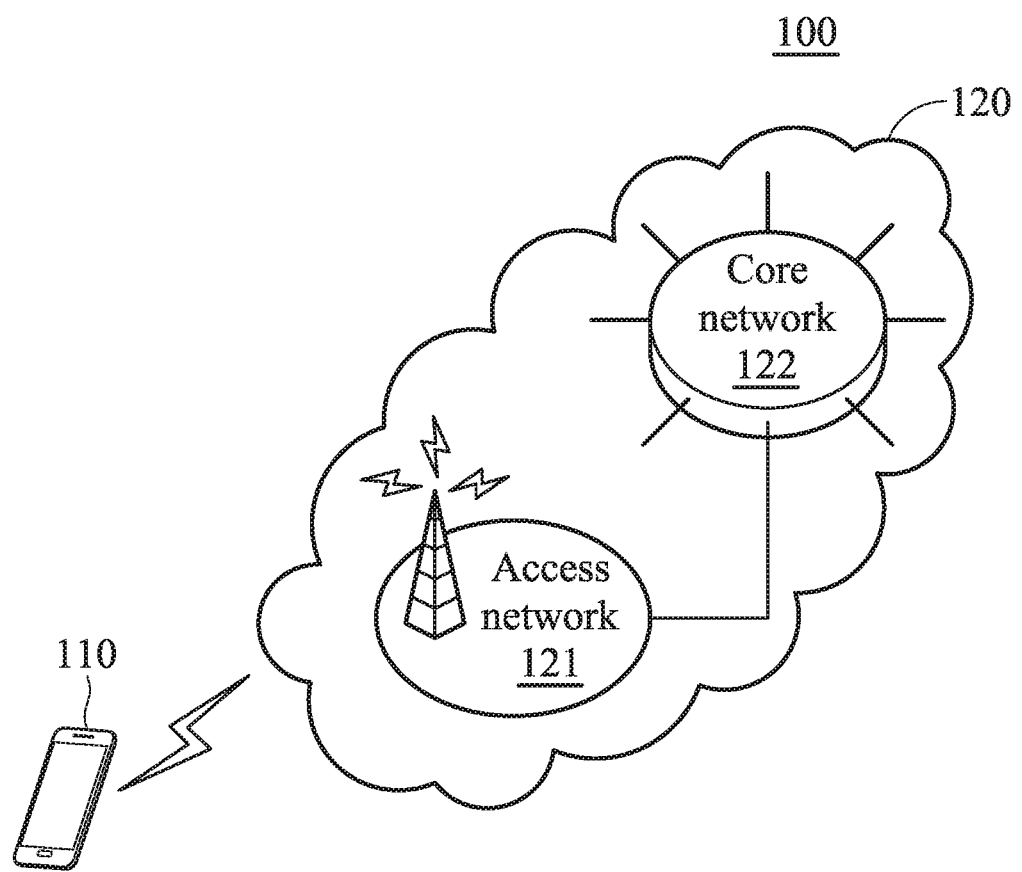
FIG. 2 is a block diagram of a wireless communication environment according to an embodiment of the application.

FIG. 2 is a block diagram of a wireless communication environment according to an embodiment of the application. As shown in FIG. 2, the wireless communication environment 100 includes a mobile communication device 110 and a telecommunication network 120, wherein the mobile communication device 110 may wirelessly connected to the telecommunication network 120 for obtaining mobile services, including services of the eMBB, URLLC, and mMTC applications.

The mobile communication device 110 may be referred to as a User Equipment (UE) or Mobile Station (MS), such as a smartphone, a panel Personal Computer (PC), a laptop computer, or any computing device supporting the cellular technology utilized by the telecommunication network 120.

The telecommunication network 120 may include an access network 121 and a core network 122. The access network 121 is responsible for processing radio signals, terminating radio protocols, and connecting the mobile communication device 110 with the core network 122, while the core network 122 is responsible for performing mobility management, network-side authentication, and interfaces with public/external networks (e.g., the Internet). The access network 121 and the core network 122 may each include one or more network nodes for carrying out said functions.

In one embodiment, the telecommunication network 120 is a 5G (e.g., New Radio (NR)) network, and the access network 121 and the core network 122 are a Next Generation-Radio Access Network (NG-RAN) and a Next Generation-Core Network (NG-CN), respectively.

An NG-RAN may include one or more base station, such as next generation NodeBs (gNBs). Each gNB may support wireless transmission and reception on high frequency bands (e.g., above 24 GHz), and each gNB may further include one or more Transmission Reception Points (TRPs). Each gNB and TRP may be referred to as a 5G base station.

Each 5G base station may form one or more cells to provide wireless accesses to the mobile communication device 110. For example, the mobile communication device 110 may camp on one or more cells, wherein the camped cells may be referred to as serving cells.

An NG-CN may include various network functions. In the network slicing technology, these network functions may be divided into UE-level network functions and service-level network functions. The UE-level network functions may include registration management, signaling connection management, mobility management, and access authentication and authorization, etc., while the service-level network functions may include session management, and path selection and management, etc.

Taking a 5G network as an example, the UE-level network functions at least include the Network Access Control Function (NACF). Logically, an NACF instance may simultaneously exist in multiple network slice instances to provide the functions of registration management and mobility management to all service sessions of a UE. On the other hand, the service-level network functions at least include the Session Management Function (SMF). Logically, there may be a respective SMF instance in each network slice instance, and each SMF instance provides the functions of session management and path selection and management for a respective service session.

For example, the mobile communication device 110 may start multiple service sessions simultaneously. Each service session is served by a respective network slice instance, and each network slice instance includes all network functions necessary to meet the requirement of the service session.

Figure 3:
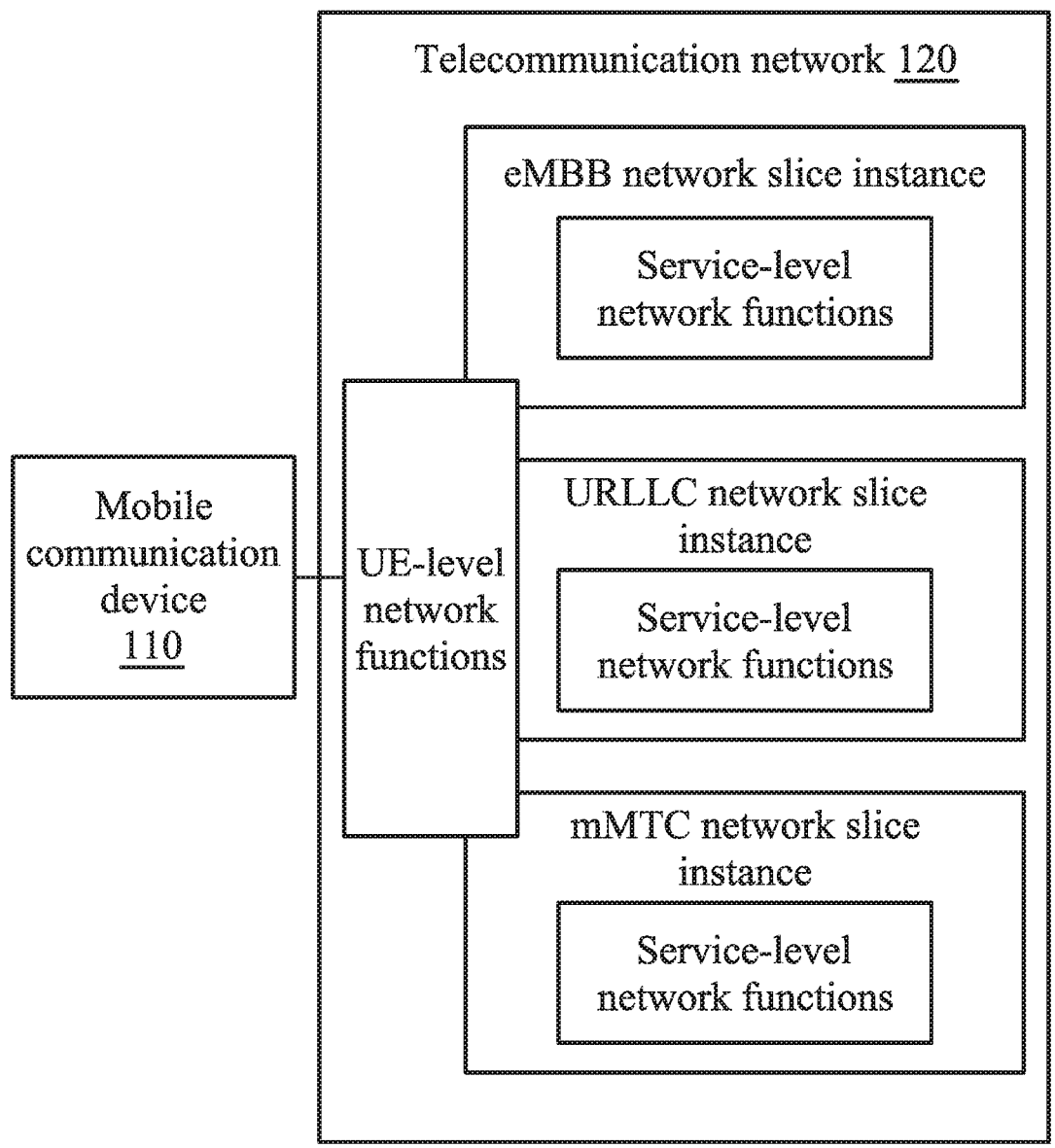
FIG. 3 is a block diagram illustrating the relations between network slices and network functions according to an embodiment of the application.

FIG. 3 is a block diagram illustrating the relations between network slices and network functions according to an embodiment of the application.

As shown in FIG. 3, the mobile communication device 110 may start multiple service sessions, and request multiple network slices from the telecommunication network 120 according to the requirements of the service sessions. The network slices include an eMBB network slice instance, an URLLC network slice instance, and an mMTC network slice instance, wherein each network slice instance includes the same UE-level network functions and different service-level network functions.

It should be understood that the components described in the embodiment of FIG. 3 are for illustrative purpose only and are not intended to limit the scope of the application. For example, the mobile communication device 110 may request any combination of network slices (e.g., one or more eMBB network slice instances, one or more URLLC network slice instances, and one or more mMTC network slice instances) from the telecommunication network 120.

Returning to the embodiment of FIG. 2, an NG-CN may include other network functions, such as Network Function Repository (NFR), and Network Slice Selection Function (NSSF), etc.

The NFR provides functionalities to assist the discovery and selection of required network functions. Each network function instance registers itself when instantiated and updates its status (i.e., activation/de-activation) so that NFR can maintain information of the available network function instances.

The NSSF provides functionalities to select appropriate network slice instances for the mobile communication device 110. When the mobile communication device 110 requests registration with the telecommunication network 120, NACF sends a network slice selection request to NSSF with preferred network slice selection information. The NSSF responds with a message including the list of appropriate network slice instances for the mobile communication device 110.

It should be understood that the components described in the embodiment of FIG. 2 are for illustrative purpose only and are not intended to limit the scope of the application. For example, the telecommunication network 120 may utilize any cellular technology (e.g., 6G or any future cellular technology) other than the 5G cellular technology, as long as the utilized cellular technology supports network slicing.

Figure 4:
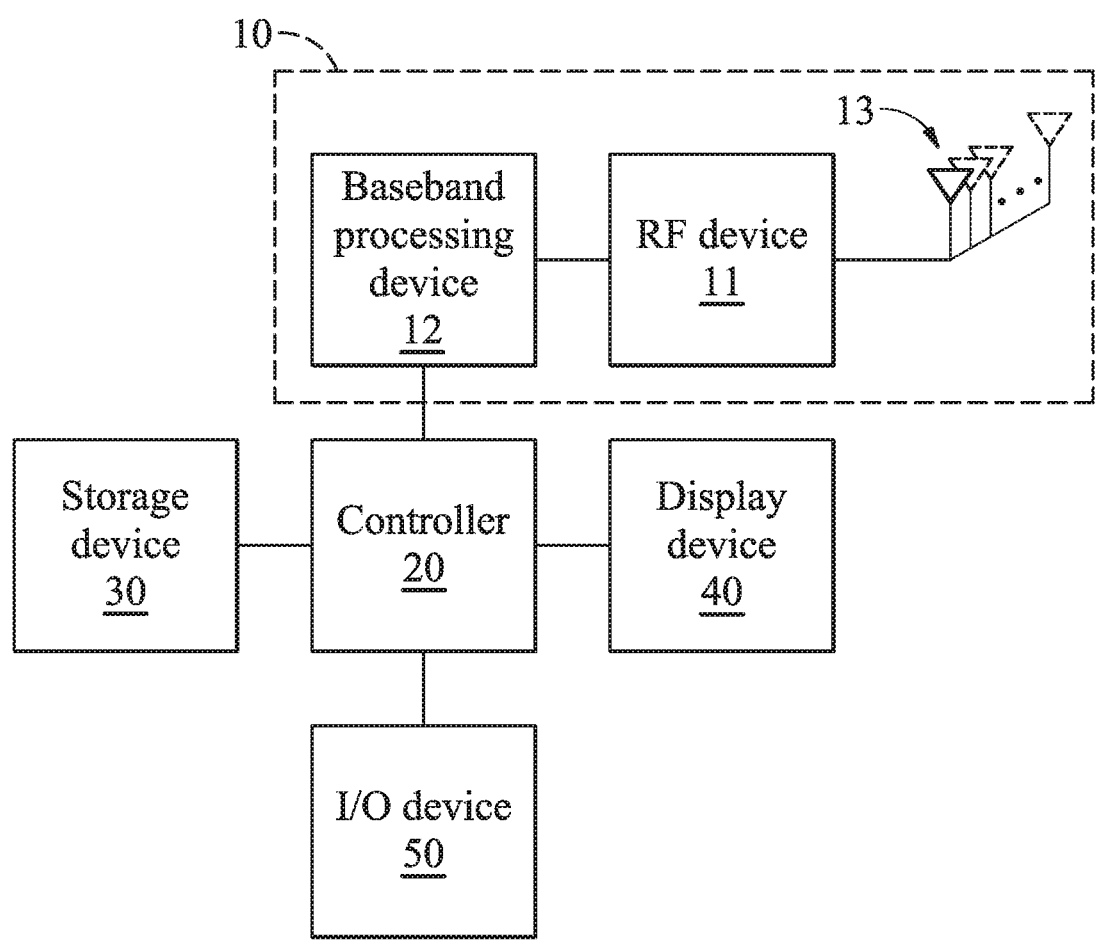
FIG. 4 is a block diagram illustrating the hardware architecture of the mobile communication device 110 according to an embodiment of the application.

FIG. 4 is a block diagram illustrating the hardware architecture of the mobile communication device 110 according to an embodiment of the application.

As shown in FIG. 4, the mobile communication device 110 may include a wireless transceiver 10, a controller 20, a storage device 30, a display device 40, and an Input/Output (I/O) device 50.

The wireless transceiver 10 is configured to perform wireless transmission and reception to and from the telecommunication network 120.

Specifically, the wireless transceiver 10 may include a Radio Frequency (RF) device 11, a baseband processing device 12, and antenna 13, wherein the antenna 13 may include an antenna array for beamforming.

The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 11 may receive RF wireless signals via the antenna 13, convert the received RF wireless signals to baseband signals, which are processed by the baseband processing device 12, or receive baseband signals from the baseband processing device 12 and convert the received baseband signals to RF wireless signals, which are later transmitted via the antenna 13. The RF device 11 may also contain multiple hardware devices to perform radio frequency conversion. For example, the RF device 11 may include a mixer to multiply the baseband signals with a carrier oscillated in the radio frequency of the supported cellular technology, wherein the radio frequency may be 24 GHz-300 GHz utilized in 5G (e.g., NR) systems, or another radio frequency, depending on the cellular technology in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the telecommunication network 120, storing and retrieving data (e.g., program code of a management program) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method for managing network slicing configuration.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. More specifically, the controller 20 may include three components, including a control unit, an Arithmetic Logic Unit (ALU), and a register, but the application is not limited thereto. The control unit is responsible for controlling function executions according to the instructions in program code. The ALU is responsible for performing arithmetic and bitwise operations on integer binary numbers. The register may be realized with a single piece of hardware to store data for arithmetic and bitwise operations and instructions to be executed by the control unit, or may be realized with two independent pieces of hardware to separately store data for arithmetic and bitwise operations and instructions to be executed by the control unit.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, Operating Systems (OS), and/or the method for managing network slicing configuration.

The display device 40 may be a Liquid-Crystal Display (LCD), a Light-Emitting Diode (LED) display, an Organic LED (OLED) display, or an Electronic Paper Display (EPD), etc., for providing a display function.

In another embodiment, the display device 40 may further include one or more touch sensors disposed thereon or thereunder for sensing touches, contacts, or approximations of objects (e.g., fingers or styluses), thereby enabling the display device 40 to be a touch-sensitive display device.

The I/O device 50 may include one or more buttons, a keyboard, a mouse, a touch pad, a video camera, a microphone, a speaker, and/or sensors (e.g., a barometric/temperature sensor, a humidity sensor, and/or a blood-pressure/heart-rate/body-temperature sensor), etc., to serve as the Man-Machine Interface (MMI) for interaction with users.

It should be understood that the components described in the embodiment of FIG. 4 are for illustrative purposes only and are not intended to limit the scope of the application. For example, the mobile communication device 110 may include more components, such as a Global Positioning System (GPS) device for use of some location-based services or applications, and/or a battery for powering the other components of the mobile communication device 110, etc. Alternatively, the mobile communication device 110 may include fewer components. For example, the mobile communication device 110 may not include the display device 40 and/or the I/O device 50.

Figure 5:
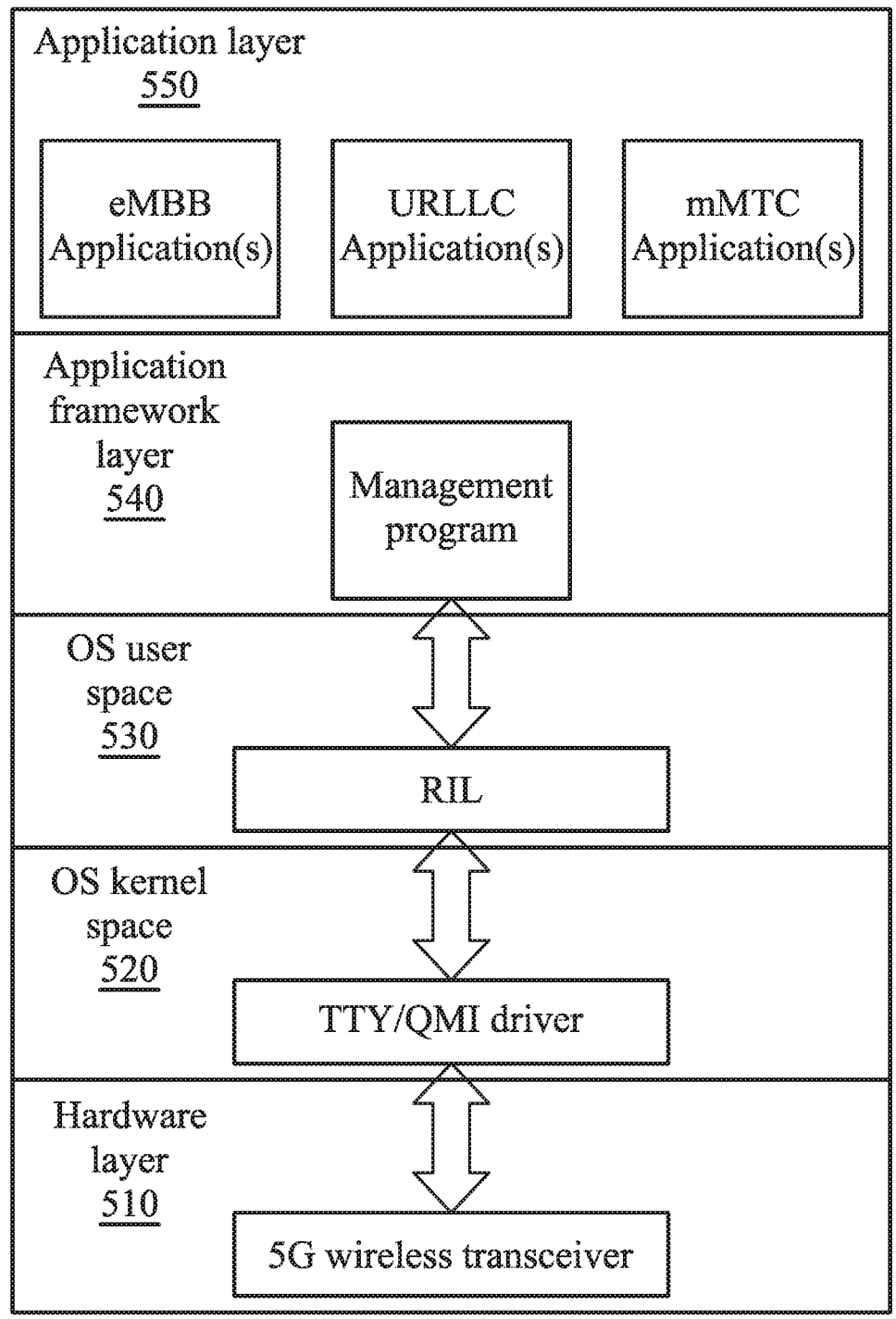
FIG. 5 is a block diagram illustrating the software architecture of the mobile communication device 110 according to an embodiment of the application.

FIG. 5 is a block diagram illustrating the software architecture of the mobile communication device 110 according to an embodiment of the application.

As shown in FIG. 5, the software architecture may include a hardware layer 510 (e.g., a 5G wireless transceiver), an OS (e.g., Linux) kernel space 520, an OS user space 530, an application framework layer 540, and an application layer 550.

The hardware layer 510 at least may include a 5G wireless transceiver (e.g., the wireless transceiver 10) to provide 5G mobile services. The hardware layer 510 may communicate with the applications in the application layer 550 via the TTY/QMI drivers in the OS kernel space 520. Please note that the 5G wireless transceiver in the present application is not only capable of providing standard 5G signaling, but also capable of providing control signaling regarding management of the network slicing configuration.

The OS kernel space 520 may include the serial interface TTY for AT command, and/or the Qualcomm chip driver QMI (Qualcomm Message Interface).

The OS user space 530 may include a Radio Interface Layer (ML) serving as the abstraction layer between the 5G wireless transceiver and the applications in the application layer 550.

The application layer 550 may include various applications, such as eMBB applications (e.g., video streaming, virtual reality, or augmented reality), URLLC applications (e.g., autopilot, automatic control, or remote surgery), and/or mMTC applications (e.g., agricultural sensors, or reservoir water sensors).

The application framework layer 540 may include a management program executed therein to perform the method for managing network slicing configuration, wherein the management includes the functions of inquiry, configuration, notification, and adaptation.

Specifically, the inquiry function refers to that the management program may inquire the hardware layer 510 (e.g., a 5G wireless transceiver) about the network slicing configuration which is currently applied between the mobile communication device 110 and the telecommunication network 120.

The configuration function refers to that the management program may determine whether the current network slicing configuration meets the requirement parameters of an activated application. If the current network slicing configuration meets the requirement parameters of the application, the management program sends a configuration complete message to the application. Otherwise, if the current network slicing configuration does not meet the requirement parameters of the application, the management program requests the hardware layer 510 (e.g., a 5G wireless transceiver) to reconfigure the current network slicing configuration to meet the requirement parameters of the application. After that, if the hardware layer 510 returns a failure message, then the management program may proactively downgrade the requirement parameters of the application (e.g., the requirement parameters indicating an eMBB network slice with a data rate value, or an URLLC network slice with a latency value), and request the hardware layer 510 to reconfigure the current network slicing configuration. If the reconfiguration fails again, the management program may notify the application of the configuration failure.

The notification function refers to that the management program, when notified by the hardware layer 510 of a new network slicing configuration from a new environment which the mobile communication device 110 has moved into, may determine whether the new network slicing configuration and the original network slicing configuration are the same. If the new network slicing configuration and the current network slicing configuration are the same, the management program may not notify the application. Otherwise, if the new network slicing configuration and the current network slicing configuration are different, the management program may notify the application of that the current network slicing configuration has changed.

In another embodiment, if the hardware layer 510 detects that the current network slicing configuration has changed and cannot meet the requirement parameters of the application, the hardware layer 510 may notify the management program, so that the management program may downgrade the requirement parameters of the application and request the hardware layer 510 to reconfigure the current network slicing configuration. If the reconfiguration is successfully completed, the management program may notify the application of the downgraded requirement parameters. Otherwise, if the reconfiguration fails, the management program may notify the application of that the telecommunication network 120 no longer supports the application service.

The adaptation function refers to that the management program may keep track the number of ongoing applications associated with each network slice, wherein the number of ongoing applications associated with a network slice is increased by one when an application associated with the network slice is activated, while the number of ongoing applications associated with the network slice is decrease by one when an application associated with the network slice is deactivated. In addition, the management program releases a network slice when the number of ongoing applications associated with the network slice equals zero.

Detailed description of each function of the management program will be further clarified in the following figures.

Figure 6:
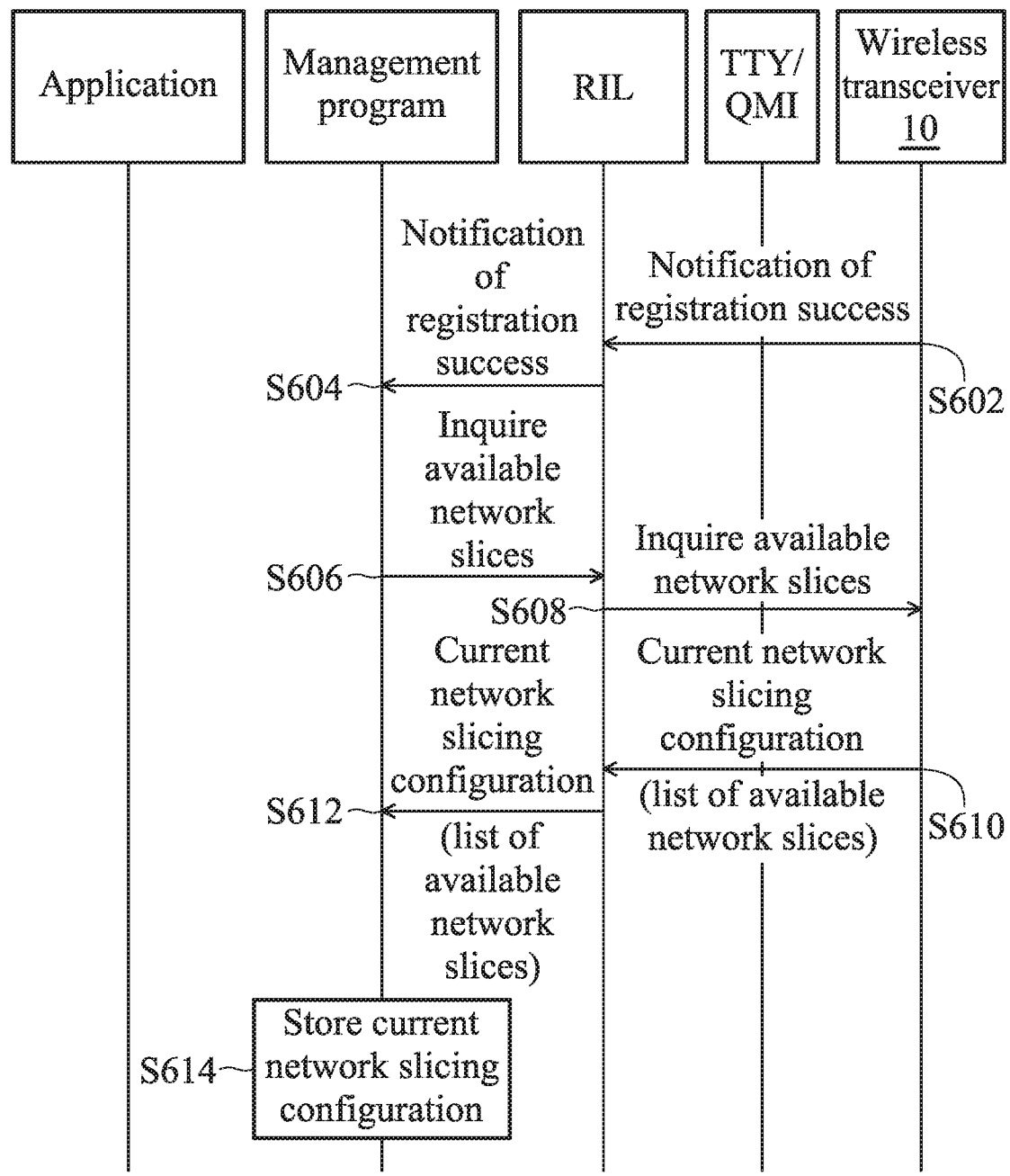
FIG. 6 is a message sequence chart illustrating the inquiry function of the management program according to an embodiment of the application.

FIG. 6 is a message sequence chart illustrating the inquiry function of the management program according to an embodiment of the application.

In step S602, the wireless transceiver 10 registers with the telecommunication network 120 after the mobile communication device 110 is powered on, and when the registration is successfully completed, sends a notification message indicating the registration success to the RIL via TTY/QMI.

In step S604, the RIL converts the notification message and sends it to the management program, wherein the conversion refers to format conversion allowing the converted message readable to the management program.

In step S606, when receiving the notification message, the management program sends an inquiry message for inquiring available network slices to the RIL.

In step S608, the RIL converts the inquiry message and sends it to the wireless transceiver 10 via TTY/QMI, wherein the conversion refers to format conversion allowing the converted message readable to the wireless transceiver 10.

In step S610, when receiving the inquiry message, the wireless transceiver 10 sends a message indicating the current network slicing configuration to the RIL via TTY/QMI.

In step S612, the RIL converts the message indicating the current network slicing configuration and sends it to the management program, wherein the conversion refers to format conversion allowing the converted message readable to the management program.

In step S614, when receiving the message indicating the current network slicing configuration, the management program stores the current network slicing configuration, so that it will not need to inquire the wireless transceiver 10 about the current network slicing configuration for any upcoming occasions of carrying the configuration function.

Specifically, the current network slicing configuration may include a list of available network slices. An example of the list may be the following: {(1) an eMBB network slice with a data rate of 250 Mb/s; (2) an URLLC network slice with a latency of 7-15 ms; (3) an mMTC network slice}.

Figure 7A:
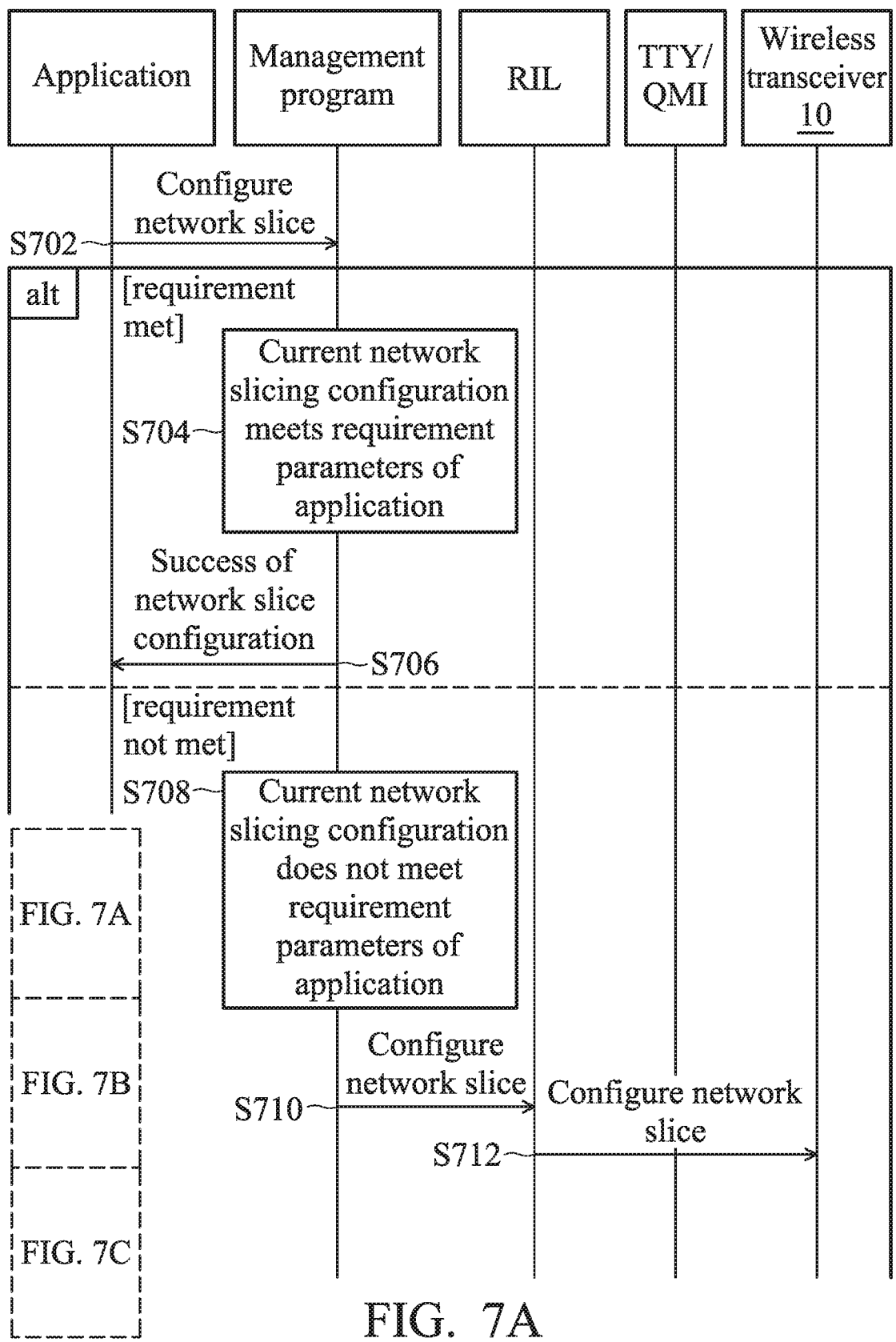
FIGS. 7A-7C show a message sequence chart illustrating the configuration function of the management program according to an embodiment of the application.
Figure 7B:
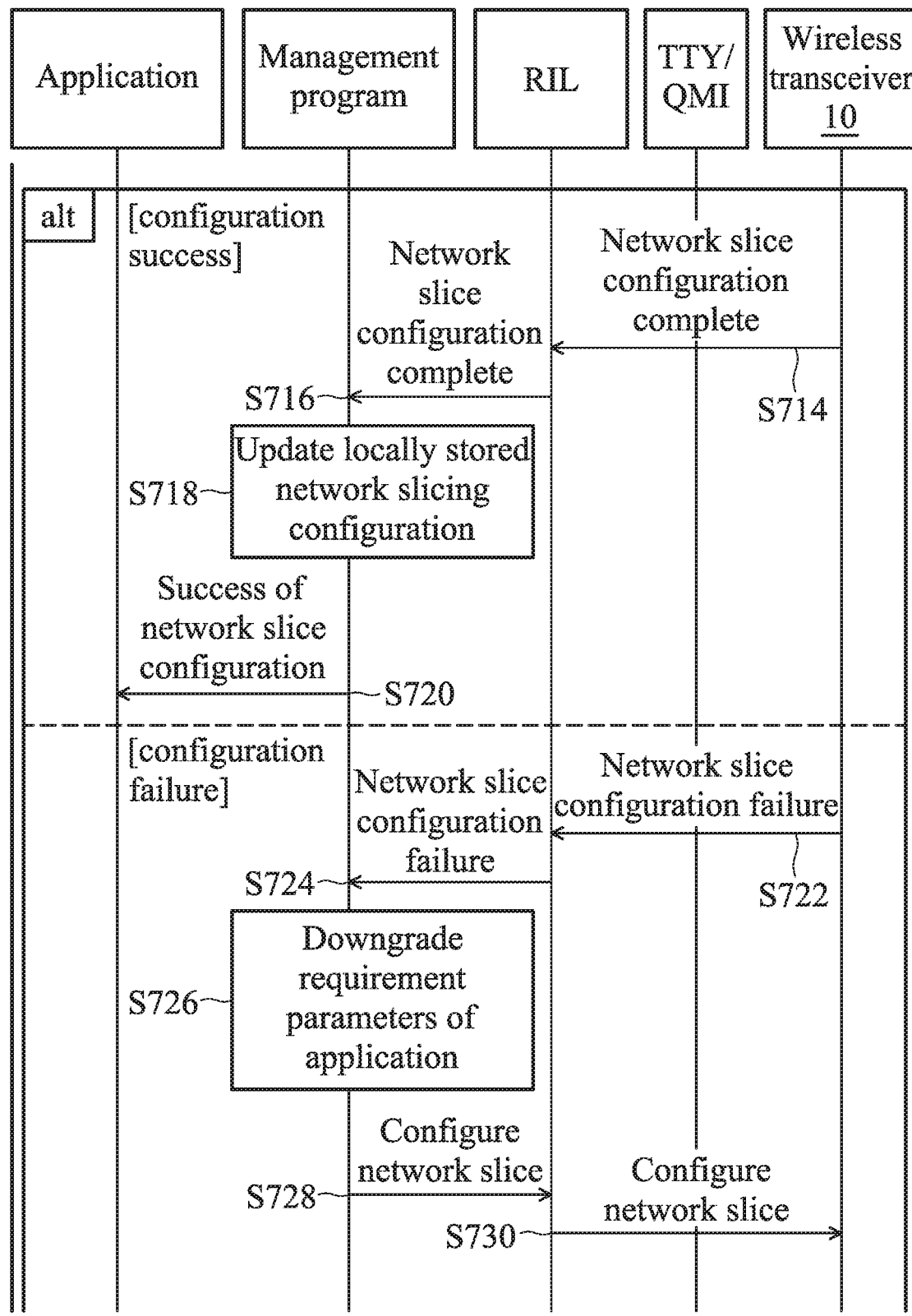
Figure 7C:
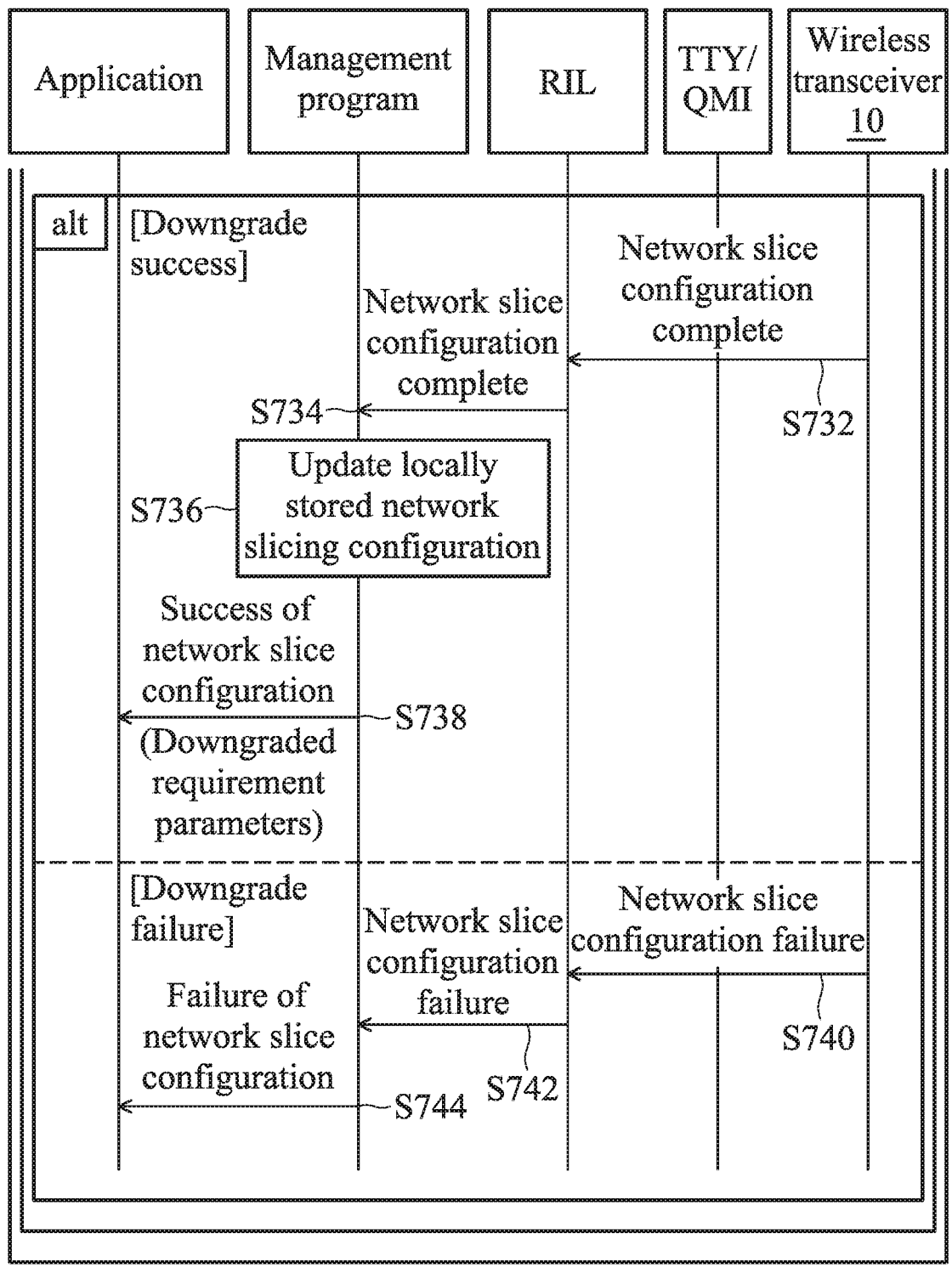

FIGS. 7A-7C show a message sequence chart illustrating the configuration function of the management program according to an embodiment of the application.

In step S702, an application, when activated, sends a request of configuring a network slice to the management program. Specifically, the configuration request may include at least the types of one or more applications (e.g., eMBB/mMTC/URLLC, or eMBB+URLLC). Alternatively, the configuration request may further include a data-rate parameter or a latency parameter.

In step S704, the management program determines that the current network slicing configuration meets the requirement parameters of the configuration request.

In step S706, the management program sends a configuration success message to the application without requesting the wireless transceiver 10 to reconfigure the current network slicing configuration.

In step S708, the management program determines that the current network slicing configuration does not meet the requirement parameters of the configuration request.

In step S710, the management program sends the configuration request to the RIL.

In step S712, the RIL converts the configuration request and sends it the wireless transceiver 10 via TTY/QMI, wherein the conversion refers to format conversion allowing the converted request readable to the wireless transceiver 10.

In step S714, after completing the configuration, the wireless transceiver 10 sends a configuration complete message to the RIL via TTY/QMI.

In step S716, the RIL coverts the configuration complete message and sends it to the management program, wherein the conversion refers to format conversion allowing the converted message readable to the management program.

Specifically, the configuration complete message in step S716 may include information of a newly added network slice, such as the application type, the data rate or latency.

In step S718, after receiving the configuration complete message, the management program updates the locally stored network slicing configuration.

In step S720, the management program sends a configuration success message to the application.

Subsequent to step S712, if configuration of the network slice fails, step S722 is performed, in which the wireless transceiver 10 sends a configuration failure message to the RIL via TTY/QMI.

In step S724, the RIL convert the configuration failure message and sends it to the management program, wherein the conversion refers to format conversion allowing the converted message readable to the management program.

In step S726, the management program downgrades the requirement parameters of the application.

For example, assuming that the original requirement parameters of the application indicate an eMBB network slice with a data rate of 250 Mb/s, the management program may downgrade the data rate to 150 Mb/s. Alternatively, assuming that the original requirement parameters of the application indicate an URLLC network slice with a latency of 7 ms, the management program may downgrade the data rate to 15 ms.

In step S728, the management program sends another configuration request to the RIL according to the downgraded requirement parameters of the application.

In step S730, the RIL converts the configuration request and sends it to the wireless transceiver 10 via TTY/QMI, wherein the conversion refers to format conversion allowing the converted request readable to the wireless transceiver 10.

In step S732, after completing the configuration, the wireless transceiver 10 sends a configuration complete message to the ML via TTY/QMI.

In step S734, the RIL converts the configuration complete message and sends it to the management program, wherein the conversion refers to format conversion allowing the converted message readable to the management program.

In step S736, after receiving the configuration complete message, the management program updates the locally stored network slicing configuration.

In step S738, the management program sends a configuration success message indicating the downgraded requirement parameters to the application.

Subsequent to step S730, if configuration of the network slice fails, step S740 is performed, in which the wireless transceiver 10 sends a configuration failure message to the RIL via TTY/QMI.

In step S742, the RIL convert the configuration failure message and sends it to the management program, wherein the conversion refers to format conversion allowing the converted message readable to the management program.

In step S744, the management program sends the configuration failure message to the application.

Figure 8A:
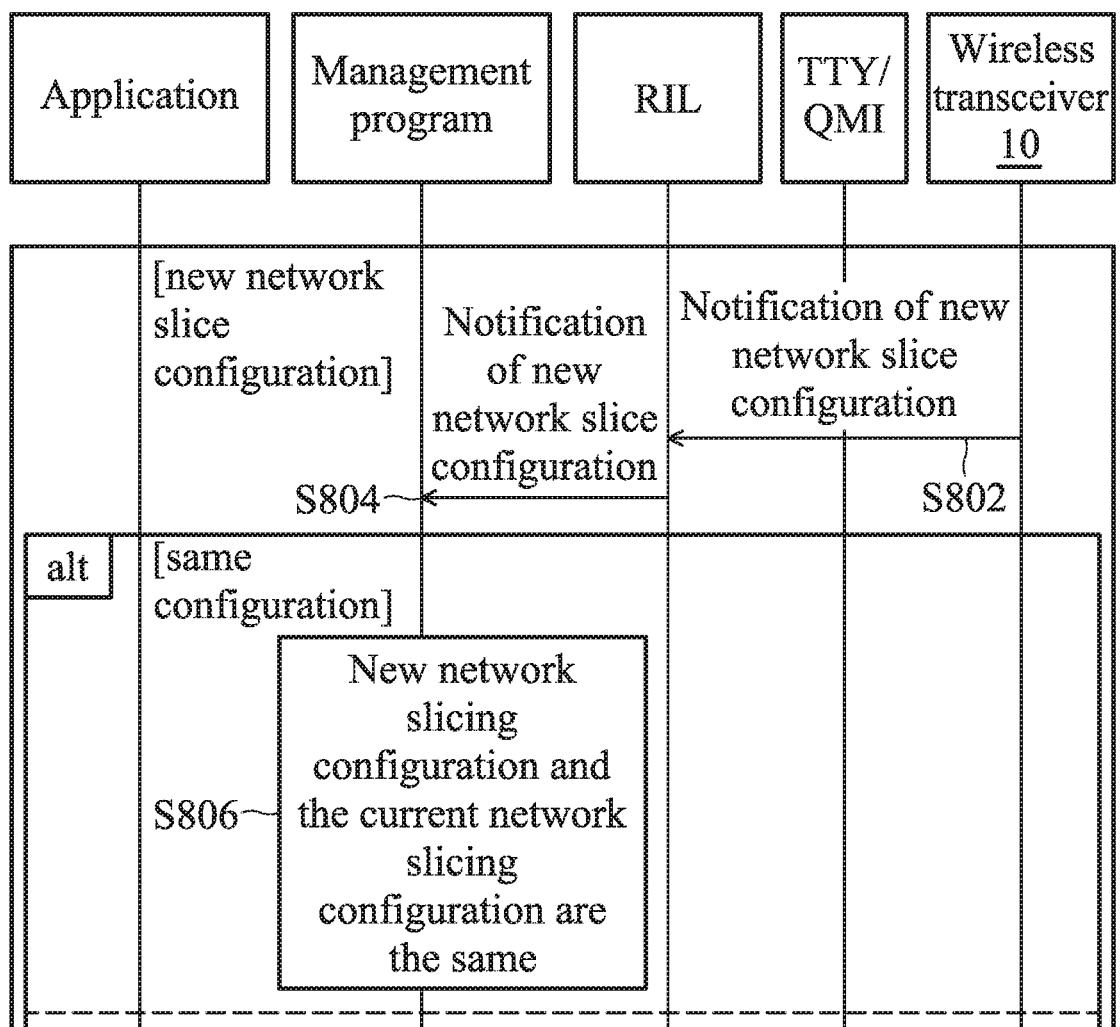
FIGS. 8A-8C show a message sequence chart illustrating the notification function of the management program according to an embodiment of the application.
Figure 8B:
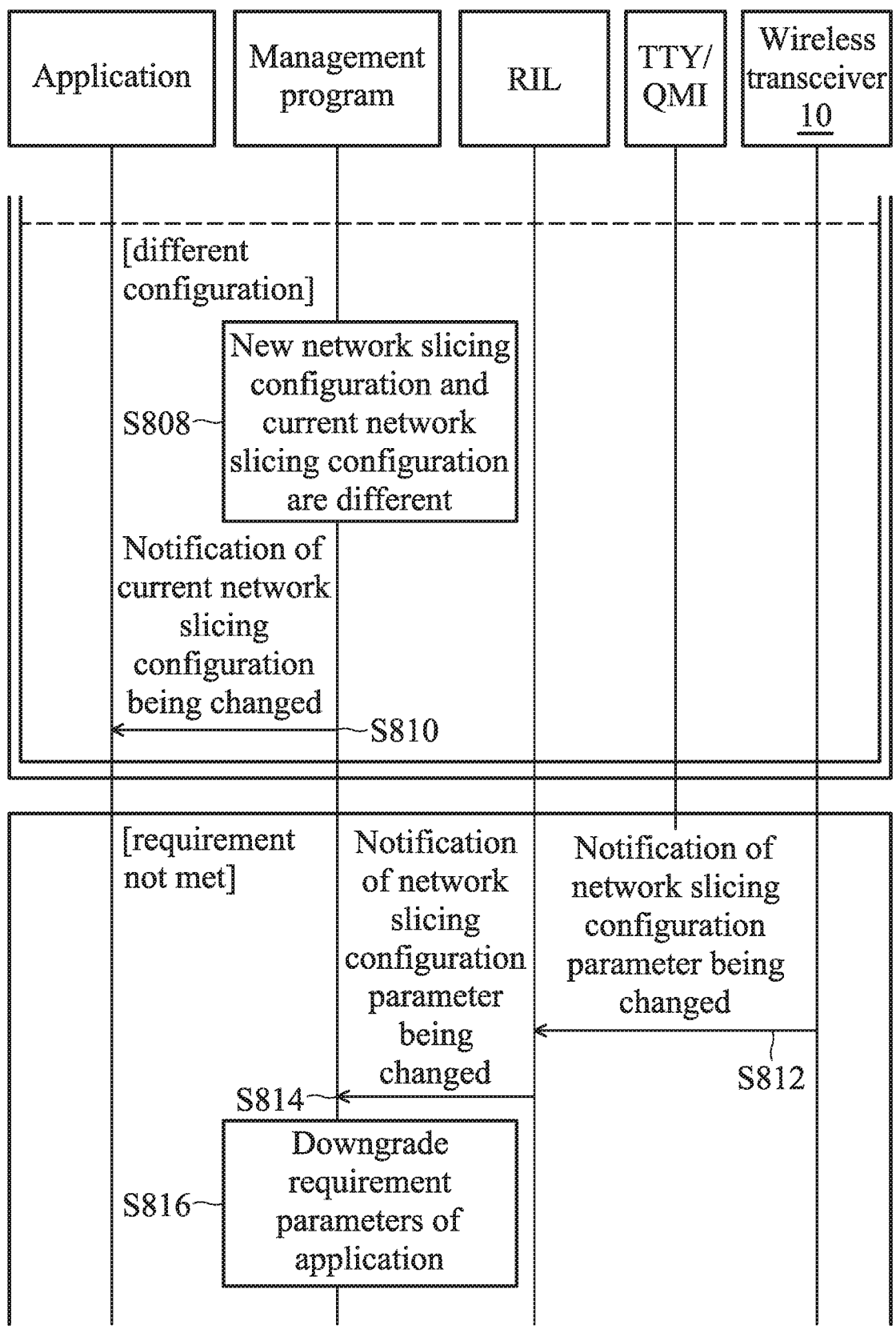
Figure 8C:
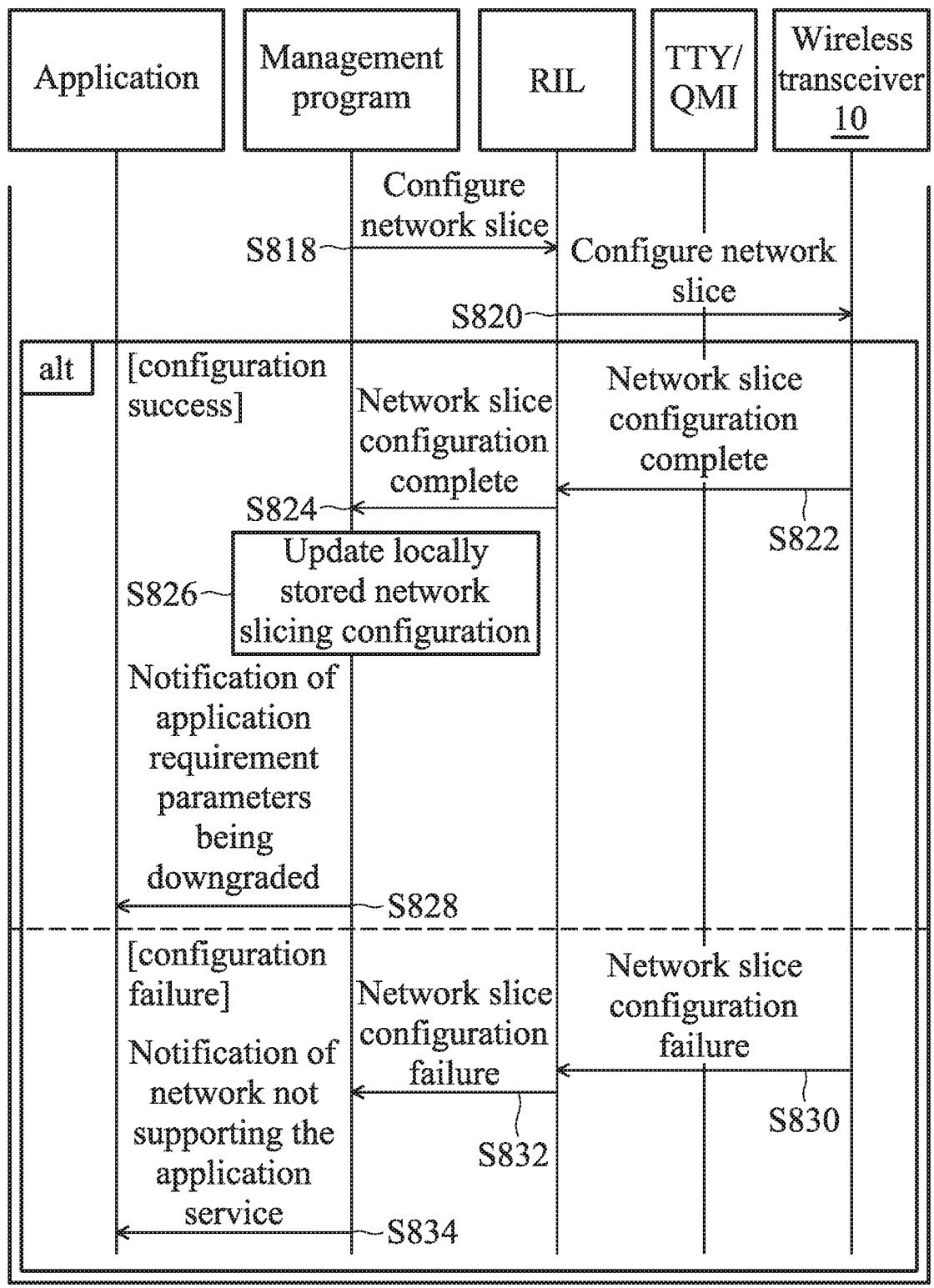

FIGS. 8A-8C show a message sequence chart illustrating the notification function of the management program according to an embodiment of the application.

In step S802, an application, when the mobile communication device 110 is moved to a new environment, the wireless transceiver 10 detects a new network slicing configuration and sends a notification of the new network slicing configuration to the RIL via TTY/QMI.

In step S804, the ML converts the notification and sends it to the management program, wherein the conversion refers to format conversion allowing the converted notification readable to the management program.

In step S806, the management program determines that the new network slicing configuration and the current network slicing configuration are the same, so it does not notify the application.

In step S808, the management program determines that the new network slicing configuration and the current network slicing configuration are different.

In step S810, the management program notify the application of that the current network slicing configuration has changed.

In step S812, when detecting that the network slicing configuration parameter has changed and no longer meets the requirement parameters of the application, the wireless transceiver 10 sends a notification of the change of network slicing configuration parameter to the RIL via TTY/QMI.

In step S814, the RIL converts the notification and sends it to the management program, wherein the conversion refers to format conversion allowing the converted notification readable to the management program.

In step S816, the management program downgrades the requirement parameters of the application.

In step S818, the management program sends a configuration request to the RIL according to the downgraded requirement parameters of the application.

In step S820, the RIL converts the configuration request and sends it to the wireless transceiver 10 via TTY/QMI, wherein the conversion refers to format conversion allowing the converted request readable to the wireless transceiver 10.

Subsequent to step S820, if the configuration request is completed successfully, step S822 is performed, in which the wireless transceiver 10 sends a configuration complete message to the ML via TTY/QMI.

In step S824, the RIL converts the configuration complete message and sends it to the management program, wherein the conversion refers to format conversion allowing the converted message readable to the management program.

In step S826, after receiving the configuration complete message, the management program updates the locally stored network slicing configuration.

In step S828, the management program notifies the application of that the current network slicing configuration has changed and the requirement parameters of the application has been downgraded.

Subsequent to step S820, if the configuration request fails, step S830 is performed, in which the wireless transceiver 10 sends a configuration failure message to the RIL via TTY/QMI.

In step S832, the RIL converts the configuration failure message and sends it to the management program, wherein the conversion refers to format conversion allowing the converted message readable to the management program.

In step S834, the management program notifies the application of that the telecommunication network 120 no longer supports the application service.

Figure 9:
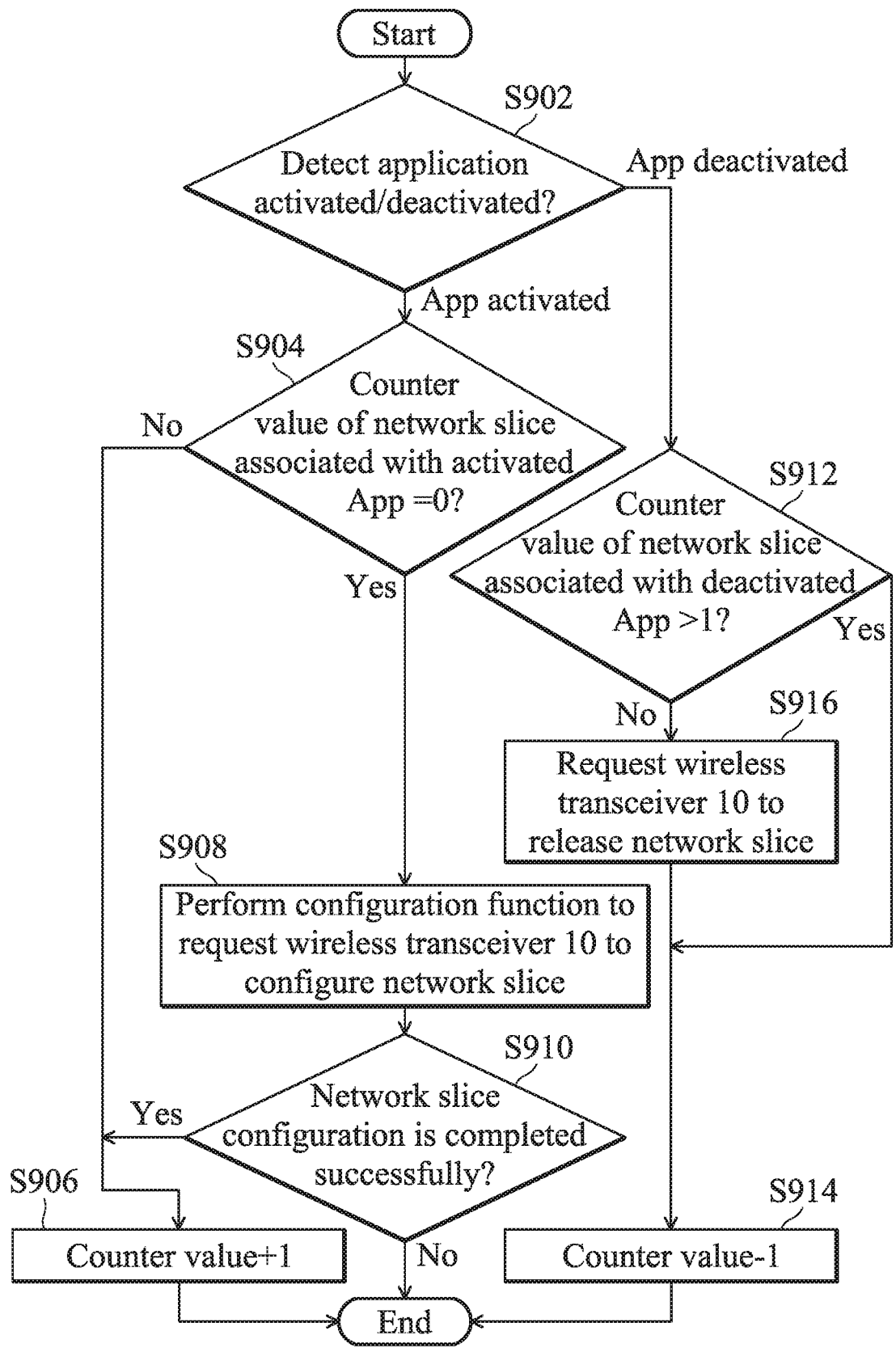
FIG. 9 is a flow chart illustrating the adaptation function of the management program according to an embodiment of the application.

FIG. 9 is a flow chart illustrating the adaptation function of the management program according to an embodiment of the application.

In step S902, the management program detects whether an application is activated or deactivated.

Subsequent to step S902, if the management program detects that an application is activated, the method proceeds to step S904 where the management program determines whether the counter value of the network slice associated with the activated application equals zero (i.e., determining whether there is already a network slice that may meet the requirement parameters of the activated application). Specifically, there is a respective counter for each network slice, which keeps the number of ongoing applications associated with the corresponding network slice.

Subsequent to step S904, if the counter value does not equal to zero, the method proceeds to step S906 where the management program increases the counter value by one.

Subsequent to step S904, if the counter value equals zero, the method proceeds to step S908 where the management program performs the configuration function to request network slice configuration of the wireless transceiver 10. Detailed description of the configuration function may refer to FIGS. 7A-7C, and it is omitted herein for brevity.

In step S910, the management program determines whether the network slice configuration is completed successfully.

Subsequent to step S910, if the network slice configuration is completed successfully, the method proceeds to step S906.

Subsequent to step S910, if the network slice configuration fails, the method ends.

Subsequent to step S902, if the management program detects that an application is deactivated, the method proceeds to step S912 where the management program determines whether the counter value of the network slice associated with the deactivated application is greater than one.

Subsequent to step S912, if the counter value is greater than one, the method proceeds to step S914 where the management program decreases the counter value by one, and the method ends.

Subsequent to step S912, if the counter value is not greater than one, the method proceeds to step S916 where the management program requests the wireless transceiver 10 to release the network slice, and the method proceeds to step S914.

In view of the forgoing embodiments, it will be appreciated that the present application realizes effective management of network slicing configuration in a UE. Particularly, in response to an application being activated, the UE may determine whether the current network slicing configuration meets the requirement parameters of the application, instead of always requesting the network side for a new network slice. Moreover, in response to an application being deactivated, the UE may determine whether or not to release the network slice associated with the deactivated application. Advantageously, the method for managing network slicing configuration may reduce power consumption in the UE and improve radio resource utilization of the 5G network.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A User Equipment (UE), comprising:
a wireless transceiver, configured to perform wireless transmission and reception using a Radio Access Technology, RAT;
a storage device, configured to store program code of a management program; and
a controller, configured to load and execute the management program in an application framework layer to perform management of network slicing configuration, wherein the management of network slicing configuration comprises:
inquiring of the wireless transceiver about first network slicing configuration that is currently applied in the wireless transceiver;
in response to an application being activated, determining whether the first network slicing configuration meets a plurality of requirement parameters of the application;
in response to the first network slicing configuration meeting the requirement parameters of the application, sending a first configuration success message to the application without requesting the wireless transceiver to reconfigure the first network slicing configuration;
in response to the first network slicing configuration not meeting the requirement parameters of the application, requesting the wireless transceiver to reconfigure the first network slicing configuration to meet the requirement parameters of the application; and in response to the wireless transceiver completing the reconfiguration of the first network slicing configuration, sending a second configuration success message to the application.

2. The UE of claim 1, wherein the management of network slicing configuration further comprises:
in response to the wireless transceiver failing to reconfigure the first network slicing configuration, downgrading the requirement parameters of the application and requesting the wireless transceiver to reconfigure the first network slicing configuration to meet the downgraded requirement parameters of the application;
in response to the wireless transceiver completing the reconfiguration of the first network slicing configuration to meet the downgraded requirement parameters of the application, sending a third configuration success message comprising the downgraded requirement parameters to the application; and
in response to the wireless transceiver failing to reconfigure the first network slicing configuration to meet the downgraded requirement parameters of the application, sending a configuration failure message to the application.

3. The UE of claim 1, wherein the management of network slicing configuration further comprises:
in response to detecting second network slicing configuration that is currently applied in the wireless transceiver, determining whether the first network slicing configuration and the second network slicing configuration are the same;
in response to the first network slicing configuration and the second network slicing configuration being the same, not notifying the application; and
in response to the first network slicing configuration and the second network slicing configuration being different, notifying the application of the first network slicing configuration being changed to the second network slicing configuration.

4. The UE of claim 1, wherein the management of network slicing configuration further comprises:
in response to the wireless transceiver detecting a parameter of the first network slicing configuration being changed and the first network slicing configuration not meeting the requirement parameters of the application, downgrading the requirement parameters of the application and requesting the wireless transceiver to reconfigure the first network slicing configuration to meet the downgraded requirement parameters of the application;
in response to the wireless transceiver completing the reconfiguration of the first network slicing configuration to meet the downgraded requirement parameters of the application, notifying the application of the downgraded requirement parameters; and
in response to the wireless transceiver failing to reconfigure the first network slicing configuration to meet the downgraded requirement parameters of the application, notifying the application of a service network not supporting network slices that correspond to a type of the application.

5. The UE of claim 1, wherein the management of network slicing configuration further comprises:
in response to the application being deactivated, determining whether there is another ongoing application associated with the same network slice as the deactivated application; and
in response to there being no other ongoing application associated with the same network slice as the deactivated application, requesting the wireless transceiver to release the network slice associated with the deactivated application.

6. A method for managing network slicing configuration in a User Equipment (UE) comprising a wireless transceiver and a controller, wherein the controller executes a management program in an application framework layer to perform the method for managing network slicing configuration, the method comprising:
inquiring of the wireless transceiver about first network slicing configuration that is currently applied in the wireless transceiver;
in response to an application being activated, determining whether the first network slicing configuration meets a plurality of requirement parameters of the application;
in response to the first network slicing configuration meeting the requirement parameters of the application, sending a first configuration success message to the application without requesting the wireless transceiver to reconfigure the first network slicing configuration; in response to the first network slicing configuration not meeting the requirement parameters of the application, requesting the wireless transceiver to reconfigure the first network slicing configuration to meet the requirement parameters of the application; and
in response to the wireless transceiver completing the reconfiguration of the first network slicing configuration, sending a second configuration success message to the application.

7. The method of claim 6, further comprising:
in response to the wireless transceiver failing to reconfigure the first network slicing configuration, downgrading the requirement parameters of the application and requesting the wireless transceiver to reconfigure the first network slicing configuration to meet the downgraded requirement parameters of the application;
in response to the wireless transceiver completing the reconfiguration of the first network slicing configuration to meet the downgraded requirement parameters of the application, sending a third configuration success message comprising the downgraded requirement parameters to the application; and
in response to the wireless transceiver failing to reconfigure the first network slicing configuration to meet the downgraded requirement parameters of the application, sending a configuration failure message to the application.

8. The method of claim 6, further comprising:
in response to detecting second network slicing configuration that is currently applied in the wireless transceiver, determining whether the first network slicing configuration and the second network slicing configuration are the same;
in response to the first network slicing configuration and the second network slicing configuration being the same, not notifying the application; and
in response to the first network slicing configuration and the second network slicing configuration being different, notifying the application of the first network slicing configuration being changed to the second network slicing configuration.

9. The method of claim 6, further comprising:
in response to the wireless transceiver detecting a parameter of the first network slicing configuration being changed and the first network slicing configuration not meeting the requirement parameters of the application, downgrading the requirement parameters of the application and requesting the wireless transceiver to reconfigure the first network slicing configuration to meet the downgraded requirement parameters of the application;

in response to the wireless transceiver completing the reconfiguration of the first network slicing configuration to meet the downgraded requirement parameters of the application, notifying the application of the downgraded requirement parameters; and in response to the wireless transceiver failing to reconfigure the first network slicing configuration to meet the downgraded requirement parameters of the application, notifying the application of a service network not supporting network slices that correspond to a type of the application.

10. The method of claim 6, further comprising:

in response to the application being deactivated, determining whether there is another ongoing application associated with the same network slice as the deactivated application; and in response to there being no other ongoing application associated with the same network slice as the deactivated application, requesting the wireless transceiver to release the network slice associated with the deactivated application.

\* \* \* \* \*